United States Patent

[11] 3,615,474

[72] Inventor Rudy D. Rosenberger
54 Franklin Ave., Souderton, Pa. 18964

[21] Appl. No. 711,693
[22] Filed Mar. 8, 1968
[45] Patented Oct. 26, 1971

[54] METHOD OF MAKING A GRID LAYOUT FOR PRINTED CIRCUITRY

4 Claims, 6 Drawing Figs.

[52] U.S. Cl. .......... 96/41, 96/43, 96/45
[51] Int. Cl. .......... G03c 5/04
[50] Field of Search .......... 96/41, 43, 45

[56] References Cited

UNITED STATES PATENTS

| | | | |
|---|---|---|---|
| 1,112,450 | 10/1914 | Hess | 96/43 |
| 3,159,486 | 12/1964 | Henderson | 96/41 X |
| 3,169,063 | 2/1965 | Johnston et al. | 96/41 X |
| 3,171,204 | 3/1965 | Balducci | 96/43 X |
| 3,254,559 | 6/1966 | Swiggett et al. | 96/43 X |

*Primary Examiner*—David Klein
*Attorney*—Seidel and Gonda

ABSTRACT: A method of making a dotted-line grid layout for printed circuitry is disclosed. A solid-line grid is photographically reproduced to obtain a positive which is then used to prepare a negative wherein the grid is of dotted lines Thereafter, the dotted-line grid negative is combined with a layout negative The combined negatives are then photographically reproduced and thereafter circuitry may be simulated by application of tape on the dotted-line grid.

INVENTOR
RUDY D. ROSENBERGER
BY Seidel & Gonda
ATTORNEYS.

INVENTOR
RUDY D. ROSENBERGER
BY Seidel & Gonda
ATTORNEYS.

METHOD OF MAKING A GRID LAYOUT FOR PRINTED CIRCUITRY

This invention relates to a method of making a grid layout for printed circuitry. Heretofore, grid layouts for printed circuitry were handmade by an engineer each time he was making a layout circuitry. Heretofore, this was accomplished by superimposing a sheet of translucent drafting material over a grid pattern of solid lines and taping the two together. Thereafter, the circuitry was applied to the layout board by use of layout tape using the solid-line grid as a guide. When the completed circuit was finished, the tape holding the two sheets together was removed.

The methods utilized heretofore have disadvantages. The prime disadvantage of the prior art is that the two sheets were orientated by eye so that there was a lack of uniformity. Even if the two sheets were properly orientated, such orientation can be destroyed because the two sheets can easily shift with respect to one another. The prior methods were time-consuming and inherently lead to errors in the application of the tape simulating the circuitry. Each time a grid layout was made, the draftsman applied numbers and other identification.

The present invention results in a product which saves substantial time for engineers while at the same time avoids inaccuracies of prior art methods. As a result thereof, repetitive circuits and matching circuits may be more accurately made in a shorter period of time.

In accordance with the present invention, the grid layout for printed circuitry has a dotted grid and all standard information applied to each circuit is photographically reproduced on the layout so that the engineer need only add any special distinguishing characteristics or identification for the particular circuit. The first step in the product of the present invention is to photograph a solid-line grid. A film positive is made from the solid-line negative in a manner whereby the positive will have the grid in dotted lines. Thereafter, the positive is photographed so as to produce a negative having the dotted-line grid.

The second negative is then combined with a negative of the basic board layout to make a master negative. Thereafter, the master negative is photographically reproduced to obtain positives on translucent photograph Mylar or other thermoplastic films. In each of the above steps, the grid whether solid or dotted is substantially larger than that intended in the end product. After circuitry is applied to the product of the present invention, it will be photographically reproduced by a reduction process so as to reduce the overall size of the circuitry and grid. When reducing the dotted line grid, the dots will disappear from view.

It is an object of the present invention to provide a novel method of making a grid layout for printed circuitry.

It is another object of the present invention to provide a photographic method of making grid layouts for printed circuitry which improve accuracy and save substantial time for engineers concerned with printed circuitry.

Other objects will appear hereinafter.

For the purpose of illustrating the invention, there is shown in the drawings a form which is presently preferred; it being understood, however, that this invention is not limited to the precise arrangements and instrumentalities shown.

Figures 1, 2, 3:
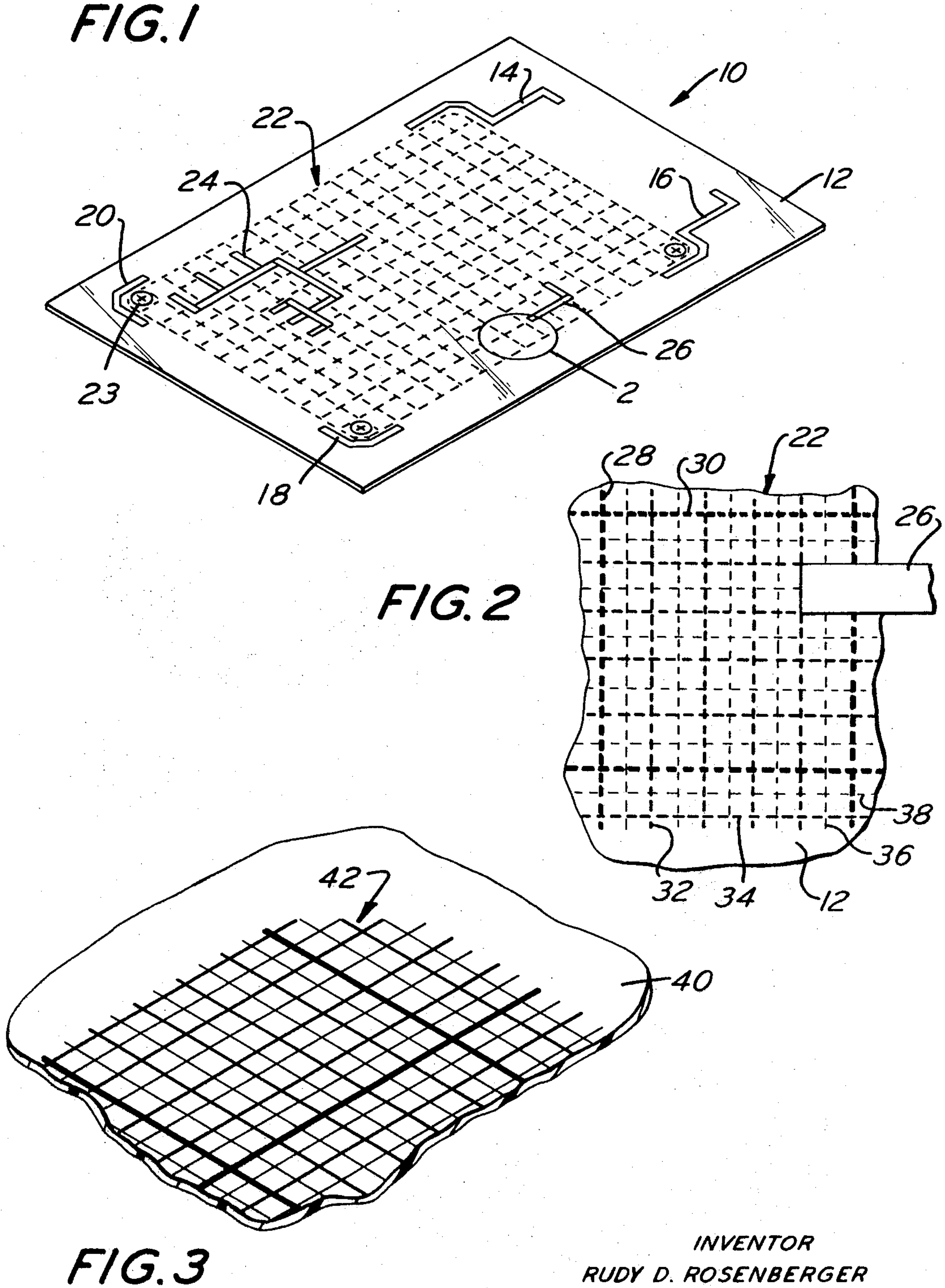
FIG. 1 is a perspective view of the grid layout for printed circuitry produced in accordance with the method of the present invention.
FIG. 2 is an enlarged detail view of a portion of FIG. 1.
FIG. 3 is a partial perspective view on an enlarged scale of a negative of a grid in accordance with one of the steps of the method of the present invention.

Referring to the drawing in detail, wherein like numerals indicate like elements, there is shown in FIG. 1 a grid layout for printed circuitry made in accordance with the present invention and designated generally as 10. A portion of the grid layout illustrated in FIG. 1 is shown on an enlarged scale in FIG. 2.

Referring to FIGS. 1 and 2, the grid layout 10 includes a sheet of translucent photographic film such as Mylar. Indicia in the form of printed lines or bands 14, 16, 18 and 20 define the peripheral corners of the circuit board. A dotted grid pattern 22 is provided within the four corners defined by the indicia 14–20. Portions of a circuit are simulated by applying strips 24 and 26 over the grid pattern 22 by means of printed circuit drafting tape.

The grid pattern 22 includes orientation marks 23 in three corners thereof for further reference with respect to other circuits. Other types of orientation marks and other locations for the same can be used. As shown more clearly in FIG. 2, the dotted grid pattern 22 is used as a guide when applying the tape strips 24 and 26.

The circuitry simulated by the tape strips 24 and 26 are substantially larger than that desired. Hence, the grid pattern 22 will be chosen so that its size will be sufficient so that it can be a guide for the circuitry. The grid pattern 22 is comprised of rows of intersecting vertical and horizontal dots. The rows of vertical dots 28 and the rows of horizontal dots 30 are of the same size. The rows of vertical dots 32 and the rows of hotizontal dots 34 are of the same size but narrower than the rows 28 and 30. The rows of vertical dots 36 and rows of horizontal dots 38 are of the same size but narrower than the rows 32 and 34. Having the rows of dots of varying thicknesses facilitates the layout of the circuit since the eye of the person working with the layout will not confuse adjacent rows.

The size of the individual dots in rows 28–38 are all identical and preferably are of a size so as to have 120–150 dots per linear inch and are 5–10 percent of the solid line. In other words, if a solid line is 100 percent of an image area, a 5–10 percent dotted line is comprised of dots occupying between 5 and 10 percent of the image area. Other sized dots may be used. The dots in rows 28 and 30 define a wider row than those in rows 36 and 38. The dots in rows 32 and 34 define wider rows than those in rows 36 and 38. The grid pattern formed thereby will have accent lines defined by the width of the rows. Other grid patterns may be used as desired.

When the grid layout 10 is photographically reduced to final size, the individual dots will be substantially invisible to the naked eye and can have no effect on the ultimate printed circuitry. Dots comprising 5–10 percent of a solid line and which are comprised of 120–150 dots per inch will become invisible after about a 25 percent reduction. If solid lines were used for the grid layout, there is always the possibility that even the photographically reduced lines could result in a short circuit of the printed circuitry. That is why two separate sheets were used heretofore so that the sheet having a solid line grid could be separated from the other sheet.

The grid 10 is made as follows:

A solid-line grid 42 is reproduced on a negative 40 by a conventional photographic step. The grid may have alternating lines of different thicknesses. A contact positive 44 is made of the negative 40 using a dotted screen, sometimes referred to as a tint screen, so that the original solid-line grid 42 is transformed into a positive dotted grid pattern 22. As is apparent, the thicker grid lines will appear to be comprised of wider rows of dots than the thinner lines.

A sheet of drafting material having indicia 14–20 and other indicia indicative of the project involved and relationship of the printed circuit to other circuitry, standard information such as title block and drawing scale, etc. is photographically reproduced to form the negative 46. The sheet of drafting material hereinafter may be referred to as a basic layout. The blank center portion of the negative 46 is cut out so as to produce the opening 48. The negative 44' is made from the positive 44 using a conventional method and is trimmed so that its periphery corresponds to the size of the opening 48.

Figures 4, 5, 6:
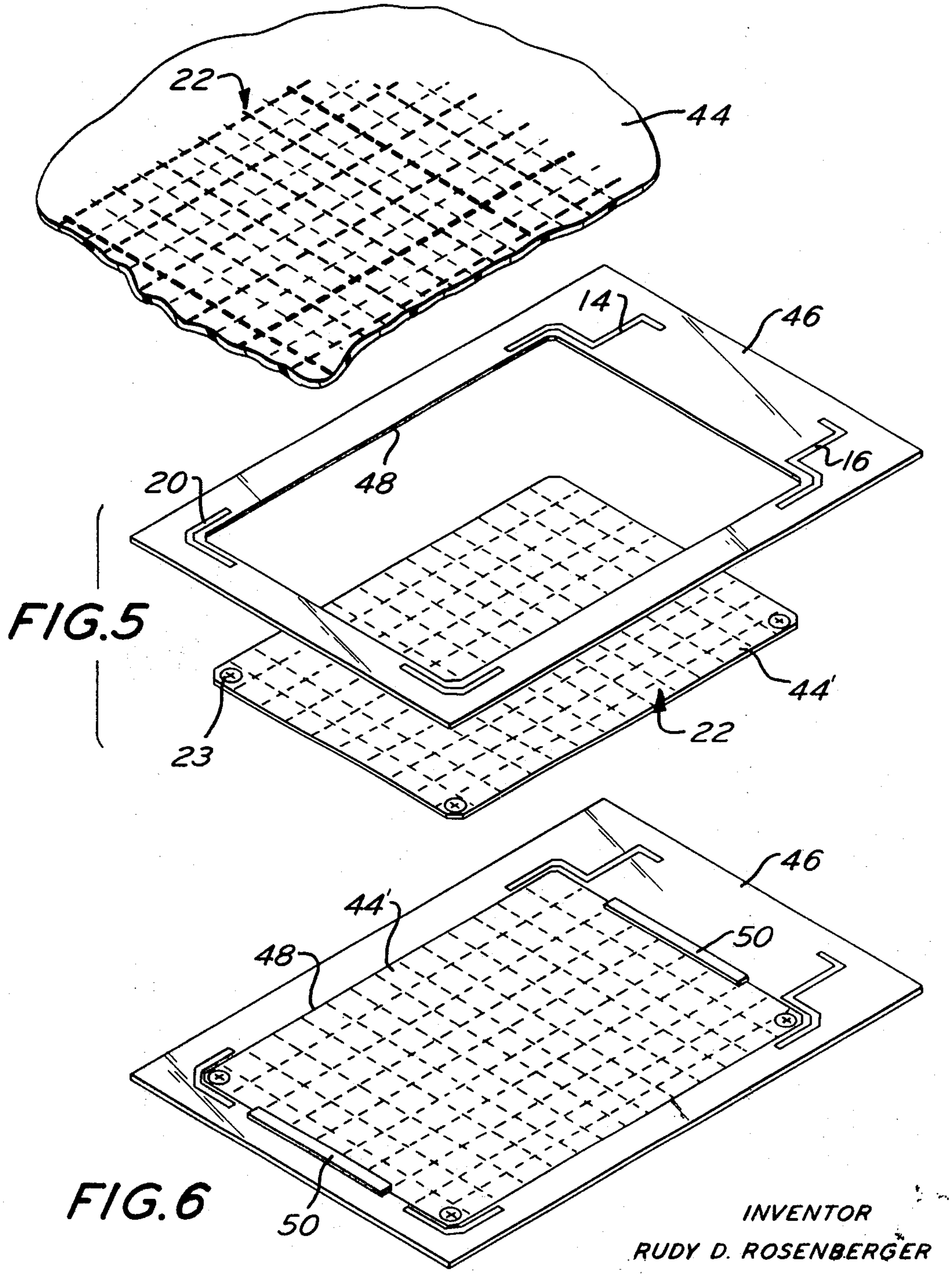
FIG. 4 is an enlarged partial perspective view of a positive made from the negative in FIG. 3.
FIG. 5 is a perspective view of the entire negative made from a positive shown in FIG. 4 juxtaposed to a negative of the board layout.
FIG. 6 is a perspective view of the master negative attained by combining the components shown in FIG. 5.

The negative 44' is inserted into the opening 48 and the two negatives 44' and 46 are then coupled together in any convenient manner. This may be done mechanically or photographically using multiple exposure techniques and duplicating film whereby both negatives are photographed, the new negatives are aligned and then rephotographed. As illustrated, the two negatives may be coupled together to form a master negative by means of tape 50. When using tape as the means for mechanically coupling the negatives 44' and 46 together, the tapes should be red so as not to photographically reproduce. Thereafter, a large number of positives are produced from the master negative shown in FIG. 6. The positives so produced correspond to the grid layout 10. Thereafter, the tape strips 24 and 26 may be applied to the grid layout to define the desired printed circuitry. Thereafter, the grid layout is processed in a conventional manner including photographic reduction and transfer to a wafer board.

All of the grid layouts 10 produced by the method of the present invention will be identical. The cost of producing the grid layouts 10 pursuant to the present invention is substantially less than the cost involved in having an engineer custom-make each grid layout in accordance with the methods utilized heretofore. Because the grid pattern 22 is a dotted pattern, it will not form a part of the printed circuitry when the grid layout 10 is photographically reduced. Since the grid pattern 22 and the conductive leads are on an integral single layer of material, circuitry will always be on coordinates as applied. It is not longer necessary to spend valuable time orientating two sheets so that the tape strips will be properly positioned. Also, there is not opportunity for layers to shift with respect to one another and thereby result in inaccuracies of purportedly mating circuits.

I claim:

1. A method of making a grid layout for printed circuitry comprising the steps of providing a grid pattern comprised of solid lines, making a first negative of said grid pattern, making a first contact positive of said grid pattern using a tint screen, said tint screen being comprised of a plurality of opaque dots of sufficient density so that said grid of solid lines appears as a grid comprised of rows of dots, making a second negative from said first positive, and making a final positive comprised of a grid of rows of dots on translucent sheet means, and using said rows of dots as guides for laying out said circuitry.

2. A method in accordance with claim 1 including the steps of making a third negative of a basic layout, said third negative being adapted to carry indicia related to circuitry to be put on said grid, combining said second and third negatives to form a master negative, and making said final positive form said master negative.

3. A method in accordance with claim 2 wherein said master negative is formed by providing an opening in said third negative, inserting said second negative into said opening, and mechanically joining said second and third negatives.

4. A method in accordance with claim 2 wherein said master negative is formed by photographically combining said second and third negatives.

* * * * *